Sept. 16, 1969    A. GLASS ETAL    3,467,064
PRIMATE CAGE
Filed June 9, 1967    5 Sheets-Sheet 1
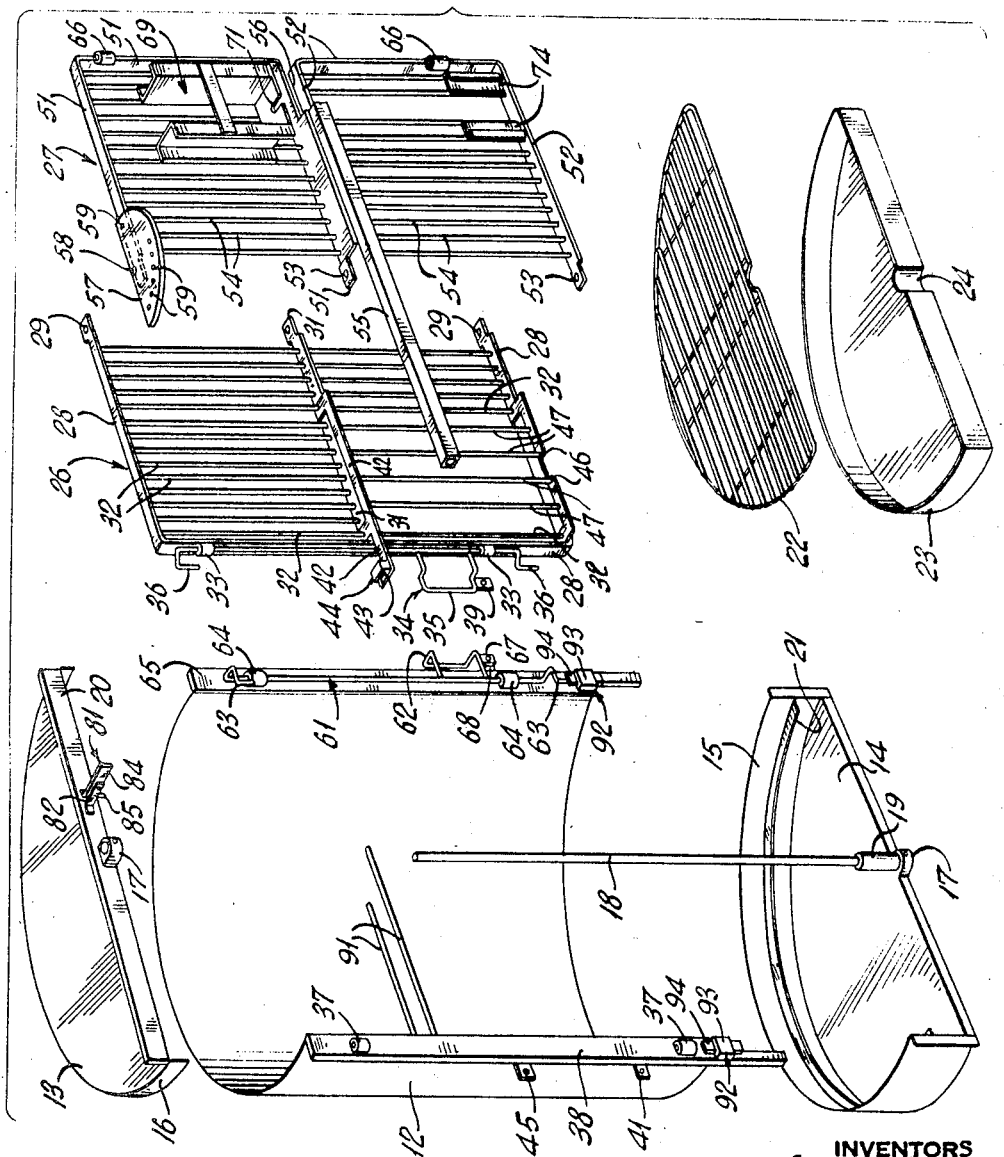
INVENTORS
ABRAHAM GLASS
GERALD F. SWEETON
BY
Blum, Moscovitz, Friedman, Blum, & Kaplan
ATTORNEYS Sept. 16, 1969  A. GLASS ETAL  3,467,064
PRIMATE CAGE
Filed June 9, 1967  5 Sheets-Sheet 2
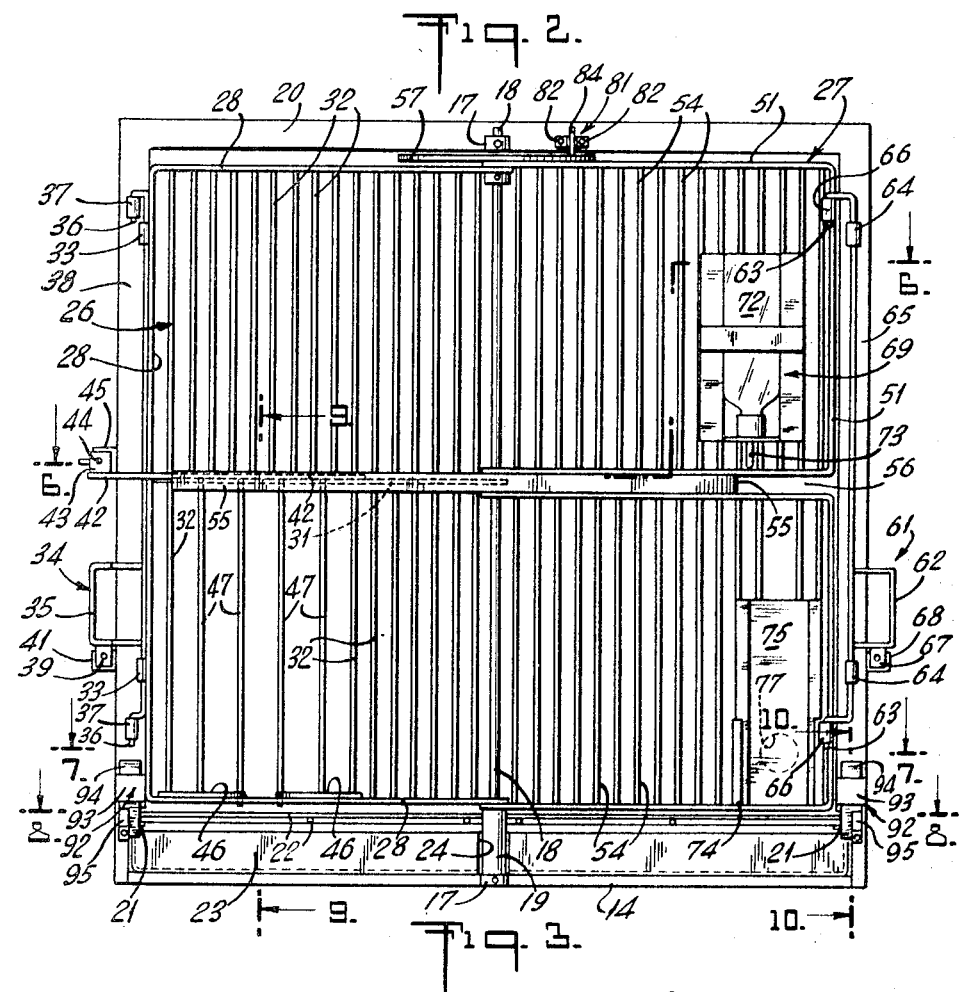
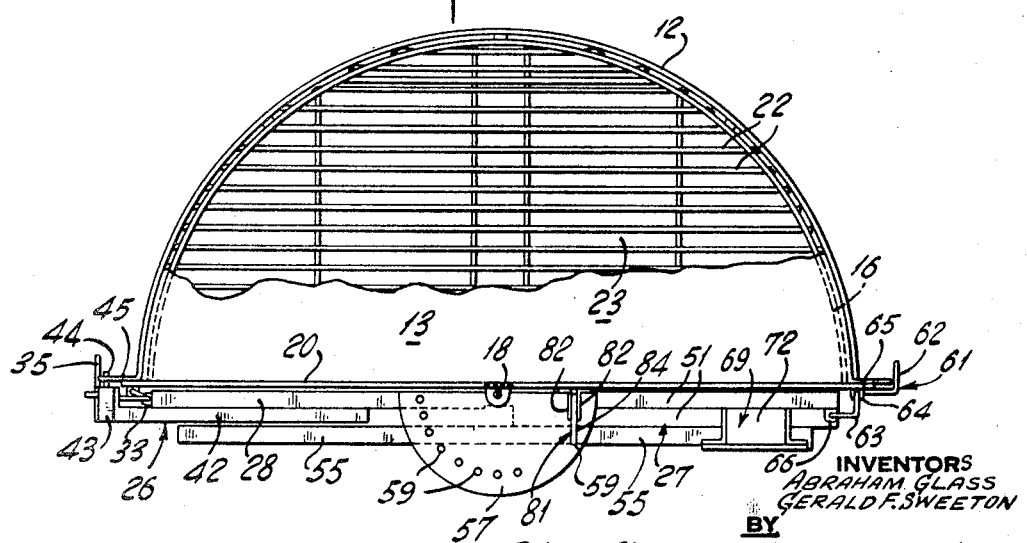
INVENTORS
ABRAHAM GLASS
GERALD F. SWEETON
BY
Blum, Moscovitz, Friedman, Blum, & Kaplan
ATTORNEYS

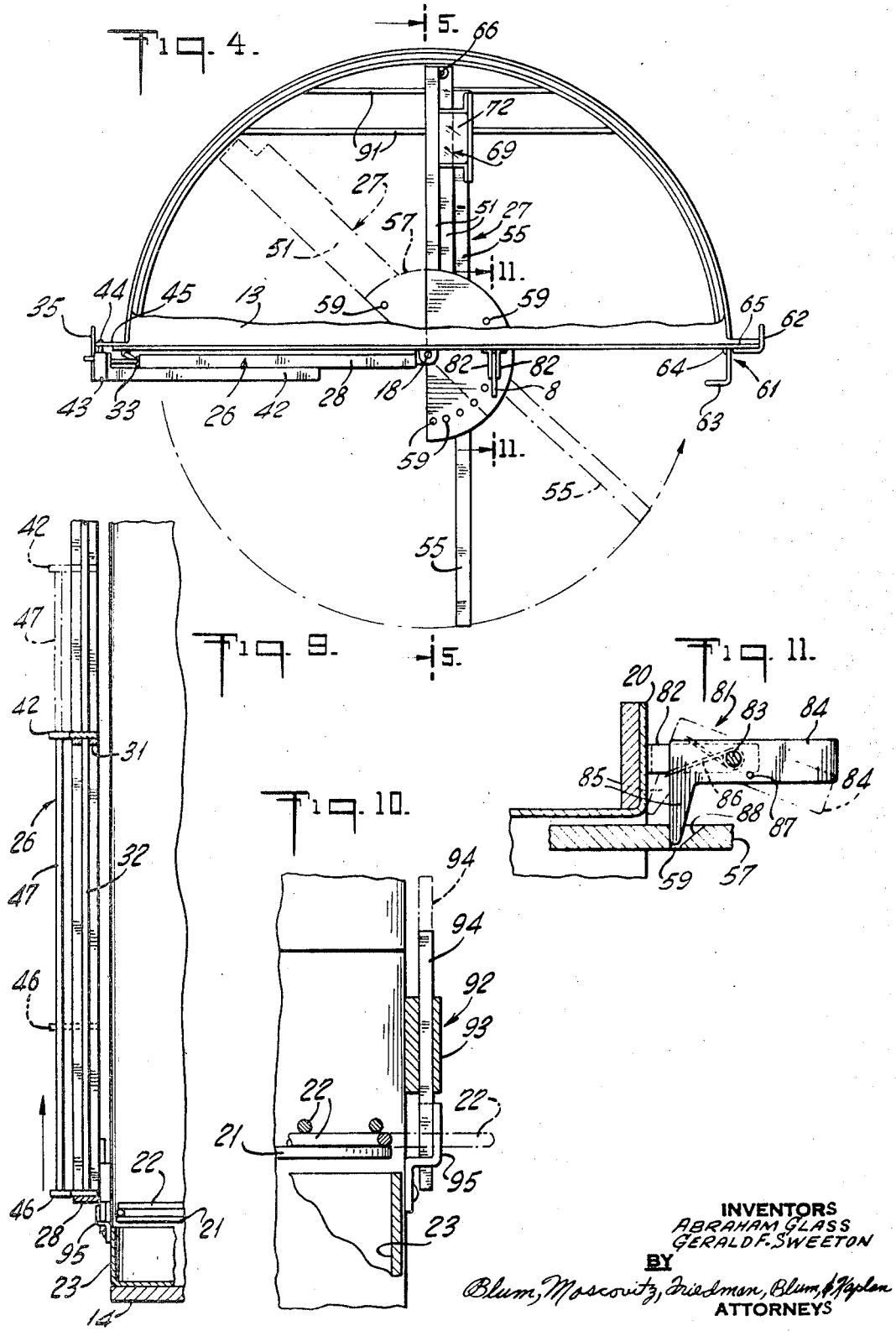

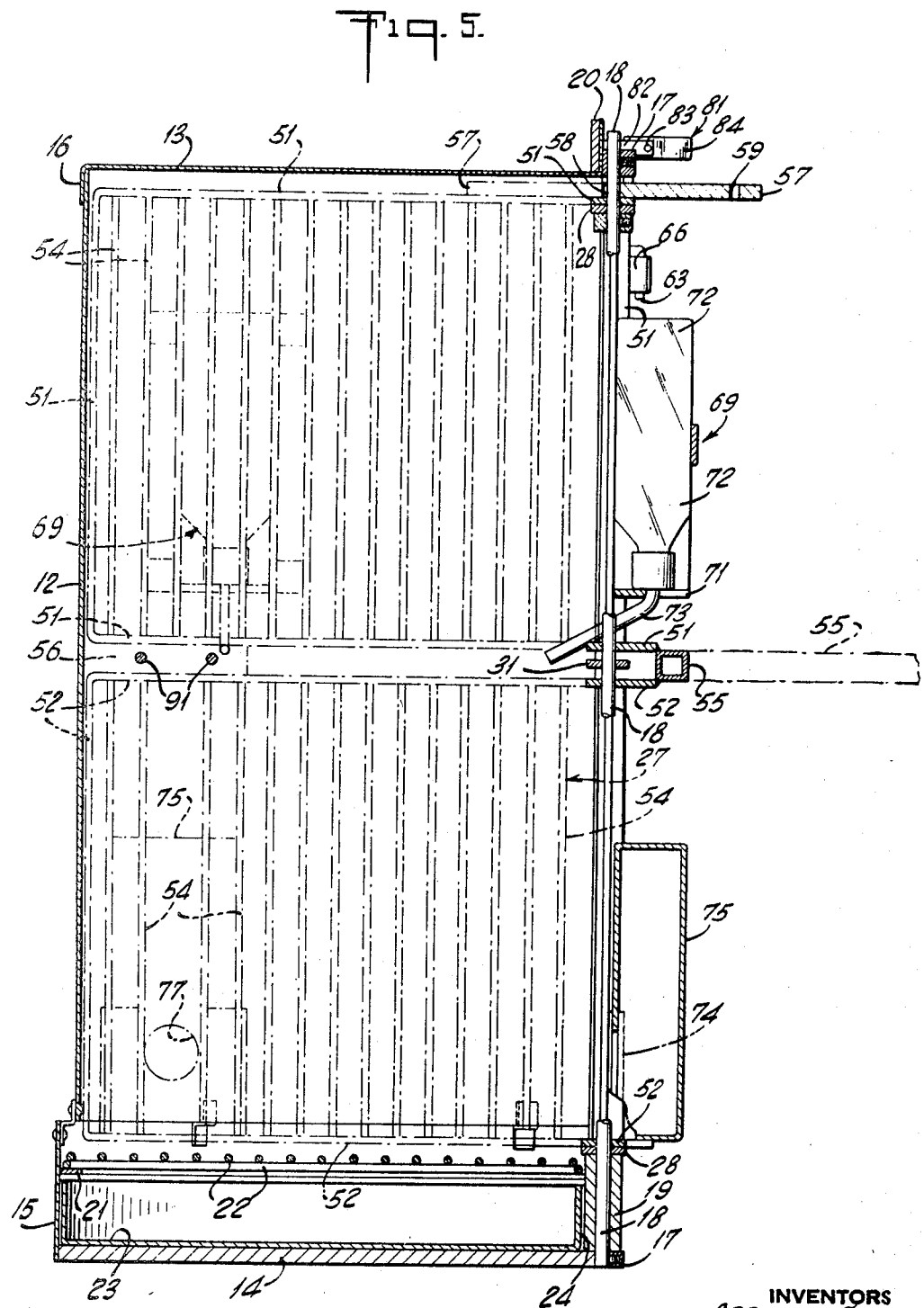

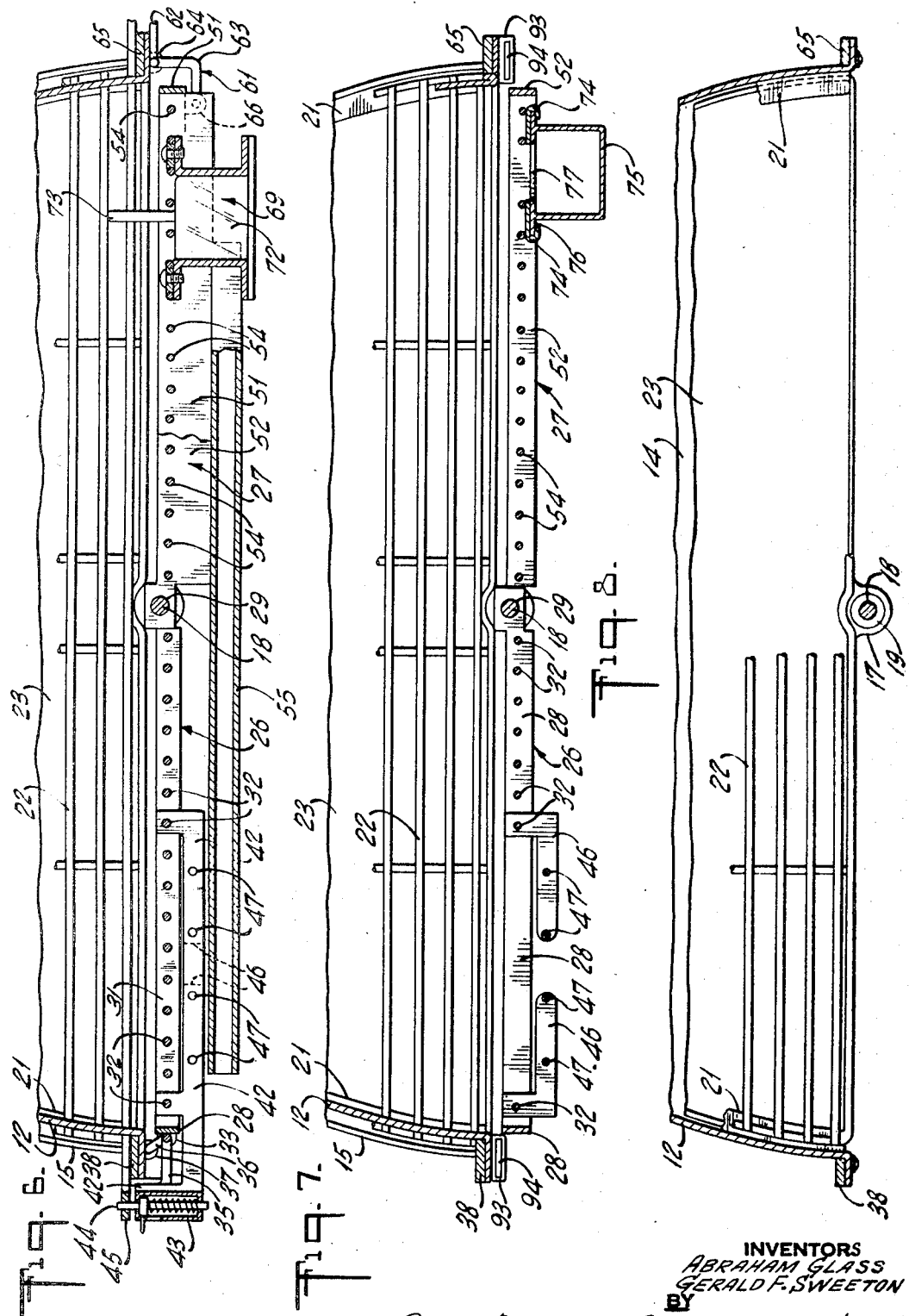

United States Patent Office 3,467,064
Patented Sept. 16, 1969

3,467,064
PRIMATE CAGE
Abraham Glass, North Plainfield, and Gerard F. Sweeton, Allentown, N.J., assignors to Porter Mathews Scientific Company, Princeton, N.J., a corporation of New Jersey
Filed June 9, 1967, Ser. No. 644,991
Int. Cl. A01k 31/06; A61d 3/00
U.S. Cl. 119—17                12 Claims

ABSTRACT OF THE DISCLOSURE

An animal cage for a laboratory animal where care and treatment of the animal may be accomplished by a single person without removing the animal from the cage. A portion of the front of the cage swings in door-like fashion in order to confine the animal for treatment with a bar lever controlling the operation of the swinging door which is held in various positions by a latch.

Background of the invention

This invention relates generally to an animal cage of the type used in laboratories for the housing of animals. Such cages are usually designed for particular animals or species and are generally of a size to comfortably house the animal for which a particular cage is designed. Animals in laboratories are generally involved in experiments which require special treatments or tests thus requiring that laboratory technicians or experimentors get hold of the animals from time to time. Quite often the animals are elusive and it often requires two or more persons to hold the animal and perform the required operation, test or treatment. This is especially true with certain animals which, while being small are quite strong.

It is desirable to house an animal in a cage which will minimize the time and effort required for the care and treatment of the animal and especiallyl to minimize the number of people required to handle the animal to perform a particular test or treatment.

Summary of the invention

Generally speaking, in accordance with the invention, a cage for an animal is provided having a living space which is adequate for the needs of the animal and having a portion which is swingable in door like fashion so as to confine the animal and hold it in a confined position in order that the animal may be easily oriented for the performance of a particular treatment or test. Since the animals are sometimes quite strong, a single person operation can be provided for by constructing the confining door with a mechanical advantage whereby the single operator can overcome the strength of the animal and providing latch means for holding the door in one of several confining positions. In such an improved animal cage, means are also provided for gaining access to the confined animal and for cleaning of the cage without removal of the animal therefrom. With the cage of the invention, a substantial benefit is provided as respects the safety of the person operating the cage and handling the animal since physical handling of the animal is substantially eliminated.

Accordingly, it is an object of this invention to provide an animal cage in which the care and treatment of the animal can be accomplished by a single person.

Another object of the invention is to provide an animal cage with a confining door operated with a mechanical advantage to overcome the strength of the animal while attempting to confine him for treatment.

A further object of the invention is to provide an animal cage with a confining door settable to preselected confining positions so that the animal may be held confined without the aid of an additional person.

Still another object of the invention is to provide an animal cage wherein the needs of the animal can be looked after with minimal effort.

Still other objects and advantages of the invention will in part be obvious and will in part be apparent from the specification.

The invention accordingly comprises the features of construction, combinations of elements and arrangement of parts which will be exemplified in the constructions hereinafter set forth, and the scope of the invention will be indicated in the claims.

Brief description of the drawings

For a fuller understanding of the invention, reference is had to the following description taken in connection with the accompanying drawings, in which:

FIG. 1 is an exploded, perspective view of an animal cage constructed in accordance with a preferred embodiment of the invention;

FIG. 2 is a front elevational view of the cage of FIG. 1 in assembled condition;

FIG. 3 is a top plan view of the cage of FIG. 2 with a portion of the top cover plate broken away;

FIG. 4 is a top plan view similar to FIG. 3 but showing the crowding door in several positions;

FIG. 5 is a sectional view taken along line 5—5 of FIG. 4;

FIG. 6 is a partial sectional view taken along line 6—6 of FIG. 2;

FIG. 7 is a partial sectional view taken along line 7—7 of FIG. 2;

FIG. 8 is a partial sectional view taken along line 8—8 of FIG. 2;

FIG. 9 is a partial sectional view taken along line 9—9 of FIG. 2;

FIG. 10 is a partial sectional view taken along line 10—10 of FIG. 2; and

FIG. 11 is a partial sectional view, at an enlarged scale, taken along line 11—11 of FIG. 4.

Description of the preferred embodiments

The general components of the animal cage may best be seen in the exploded FIG. 1 view. The cage has a general configuration of an upright semi-cylinder with a semi-cylindrical rear wall 12, a top cover plate 13 and a base plate 14. The base plate is provided with an upstanding flange 15 which mates with the lower portion of rear wall 12 and the top cover plate is provided with a depending flange 16 which also mates with the rear wall to thereby define a semi-cylinder whose open side lies along a diametrical plane. A journal 17 extends from the front edge of top cover plate 13 and base plate 14 and has mounted therein a rod 18 which extends the full height of the cage. A sleeve 19 surrounds the rod at the lower end.

Projecting radially inwardly from flange 15 is a ledge 21 which supports a wire rack 22 which defines the bottom of the habitable portion of the cage. Resting on the inner surface of base plate 14 is a shallow pan 23 which is semi-circular in plan with the flat upstanding wall of the pan being provided with a semi-cylindrical depression 24 adapted to mate with the outside surface of sleeve 19. When pan 23 overlies the inner surface of base plate 14, semi-cylindrical depression 24 surrounds a portion of sleeve 19 whereupon removal of the pan is possible by rotation thereof about the longitudinal axis of rod 18. In such manner, pan 23 will normally remain in position below wire rack 22 but can be readily removed for cleaning.

The front door of the cage is divided into a left section 26 and a right section 27. Each door section is pivoted independently as will be hereafter described for carrying out one of the principal features of the invention. Left door section 26 is formed of a substantially U-shaped frame 28 with the ends of the U's provided with suitable apertures 29 by which the left door section is rotatably mounted on rod 18. A central bar 31 extends parallel to the legs of the U and is also provided with an aperture 29 for accommodating rod 18. A plurality of vertical rods 32 extend between the legs of U-shaped frame 28 and through central bar 31 to form a grate-like door section. Certain of rods 32 terminate in central bar 31 as will hereafter be apparent while other rods extend the full height of the left door section.

The outer surface of the base portion of U-shaped frame 28 is provided with a pair of sleeves 33 which slidably receive a wire latch member 34 having a handle portion 35 and hook portions 36 at the ends thereof. The hook portions are adapted to be received in sleeves 37 carried by a left flange 38 on rear wall 12. It will be seen that when the left door section 26 is closed, latch member 34 may be raised so as to position hook portions 36 in sleeves 37 to thereby lock the left door section in the closed position. An apertured tab 39 on handle 35 may mate with an apertured tab 41 on flange 38 whereby, in the latched position, a lock or other suitable locking device may be passed thru the mating apertured tabs to prevent unlatching of the left door section.

As stated hereinabove, certain of rods 32 do not extend the full height of the door section but terminate in central bar 31. This is to provide, in the left door section, for what may be termed a guillotine door which can be opened to provide access to the animal for treatment or testing without removing the animal from the cage. An E-shaped bar 42 is positioned above central bar 31 and has one end leg and one central leg slidably mounted on selected rods 32. The other outer leg is provided with a latch 43 having a latch pin 44 adapted to be received in apertured tab 45. Latch 43 is preferably provided with a spring to bias the latch pin outwardly, but may be of any suitable construction such as that shown in detail in FIG. 6. Two L-shaped plates 46 are positioned over the lower leg of frame 28 with the ends of each L being slidably mounted on the same rods 32 which carry E-shaped bar 42. A plurality of rods 47 extend between and are connected to E-shaped bar 42 and L-shaped plates 46. Rods 47 close, in grate-like fashion, the opening in the left door section left by rods 32 which terminate at central bar 31. When latch 43 is unlatched, the guillotine door defined by E-shaped bar 42, L-shaped plates 46 and rods 47 may be raised to provide access to the interior of the cage. The mating ends of L-shaped plates 46 are preferably spaced from one another to aid in capturing a limb of an animal to be treated. For example, if the guillotine door is raised and the limb grasped and withdrawn thru the open guillotine door, the guillotine door can then be closed while the animal is treated and the spacing of the ends of plates 46 will permit the limb to enter between adjacent rods 47.

Right door section 27 consists of an upper U-shaped frame 51 and a lower U-shaped frame 52 each having apertures 53 for rotatably mounting the frames on rod 18. A plurality of rods 54 extend between and are secured in the legs of the respective U-shaped frames to define upper and lower door halves which are grate-like. The upper and lower door halves are secured together to form the complete right door section 27 by means of a relatively long lever bar 55 which extends between the upper and lower halves and well beyond the line of pivot of rod 18. Lever bar 55 terminates short of the right or outer edge of right door section 27 to provide a slotted opening 56 whose use will hereafter be described. Secured to the top leg of upper U-shaped frame 51 is a semi-circular plate 57 having a central aperture 58 co-axial with apertures 53 whereby the semi-circular plate is mounted on rod 18. Plate 57 is also provided with a plurality of apertures 59 located along an arc of a circle whose center is the center of aperture 58.

A latch member 61 similar to latch member 34 is provided for latching the right door section in the closed position. The latch member has a handle portion 62 and hook portions 63 with the latch member being slidably mounted in sleeves 64 carried by right flange 65 of the rear wall. The right door section has mounted thereon sleeves 66 which receive the hook portions 63 for latching the right door section in closed position. Handle portion 62 is also provided with an apertured tab 67 adapted to mate with a corresponding apertured tab 68 on flange 65 whereby the latch member may be locked in the latching position by preventing sliding action of the latch member.

It is also desirable to provide feeders for the animal to be housed in the cage. By way of example, a watering member 69 is attached to the upper portion of the right door section and it is constructed so as to provide a bottle receiving support having a slot 71 in the base plate thereof for receiving a bottle 72 which includes a drinking tube 73, as best shown in FIG. 5. With the bottle, liquids can be made available to the animal.

For solid foods, a pair of channel shaped members 74 are secured to rods 54 with the channel members opening toward one another. A feeder box 75 has outwardly extending flanges 76 (FIG. 7) through which the feeder box is received and supported by channel shaped members 74. The feeder box is provided with an opening 77 in its front wall through which the animal gains access to the solid foods placed in the feeder box. In order to permit access to the feeder box by the animal, it may be desirable to provide a greater spacing of rods 54 in the area of the feeder box than at other points along the right door section. Note that both the bottle for liquids and the feeder box for solid foods may be removed, cleaned and refilled from outside the cage without the necessity of gaining access to the interior of the cage.

As stated hereinabove, one of the principal features of the instant invention is the capability of the disclosed cage for utilization in the care, treatment, testing, etc. of an animal by a single person. The guillotine door has been described above whereby the animal can be grasped for treatment without removal from the cage and whereby a limb or other extremity can be moved to a position outside the cage while keeping the animal in the cage. However, before the animal can be grasped through the guillotine door, it is necessary that it be crowded close to the door and it is for this reason that at least one door section be independently pivotally mounted on rod 18 and independently latched. However, even more important is the provision of lever bar 55 which has a handle extending well past the pivot of the door in order to provide a substantial mechanical advantage for crowding of the animal. It is also for this reason that semi-circular plate 57 with apertures 59 is mounted to the right door section for latching of the door section in various animal crowding positions as will now be described.

A latch member 81 is secured to an upstanding flange 20 formed as part of top cover plate 13. The latch member, which is best seen in FIG. 11 includes support plates 82 which carry a pivot pin 83 and an L-shaped lever 84 which is provided with a latch point 85. A spring 86 acts between the support plates and the lever to bias the lever to the latching position with latch point 85 in a selected aperture 59. A stop pin 87 may also be provided on the lever to engage the support plates in order to limit the amount of projection of latch point 85 into aperture 59.

When right door section 27 is in its normal closed position, it may be latched by latch member 61 and an aperture 59 adjacent an edge of semi-circular plate 57 is provided for receiving latch point 85. When it is desired to crowd the animal toward the guillotine door formed in the left door section, latch member 61 is unlatched and lever bar 55 is gripped firmly. Through the lever bar, right door section 27 may be rotated inwardly of the cage to a right angle position shown in full lines in FIG. 4 or to a position beyond such as is shown in phantom lines in FIG. 4. In order to hold the door in an animal crowding position, latch member 81 cooperates with selected apertures 59 in the semi-circular plate to releasably latch the right door section. Due to the provision of lever bar 55, a single person can apply substantial force to the right door section for crowding the animal and moving it toward the guillotine door despite the substantial strength of some animals. Once the animal is crowded as desired, the right door section is held in the crowding position by means of latch member 81. It is desirable that the trailing edge 88 of each aperture 59 be inclined in order that latch point 85 may slide in ratchet-like fashion from one aperture 59 to the next adjacent aperture as the right door section is moved to an increasingly crowding position. Naturally the leading edge of each aperture is upright so that movement of the right door section away from the crowding position can be accomplished only by physical rotation of lever 84. It is understood that the provision of lever bar 55 introduces a mechanical advantage making possible a one-man operation. If desired, a rod (not shown) can be telescopingly received in or otherwise attached to lever bar 55 for extending the effective length of the lever bar for increasing the mechanical advantage imparted by the lever bar.

It will be noted that horizontal rods 91 extend across rearwall 12 to provide a perch for the animal. The level of rods 91 coincides with slotted opening 56 in the right door section whereby movement of the door section to the crowding position will not be blocked by the perch rods.

As stated hereinabove, both wire rack 22 and shallow pan 23 are rotatably supported by base plate 14. It is desirable that inadvertent rotation of wire rack 22 and pan 23 be prohibited and for this purpose a pair of stops 92 may be provided.

The stops are secured respectively to flanges 38 and 65 and each stop consists of a block 93 (FIG. 10) through which is slidably received a plate 94 which extends above the block to permit grasping thereof and below the block to interfere with or prevent rotation of wire rack 22 and pan 23. A clip 95 is secured to a portion of flange 15 to limit downward movement of its associated plate 94. Naturally, clip 95 does not interfere with wire rack 22 and thus, upon lifting of plate 95 in one of the stops 92, the wire rack 22 may be rotated for removal.

It will thus be seen that the objects set forth above, among those apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

What is claimed is:

1. An animal cage comprising, in combination, a semi-cylindrical wall, end walls closing the ends of said semi-cylindrical wall, a front wall means secured with the cage lying along a plane through the major diameter of the semi-circle of said semi-cylindrical wall, the aforesaid walls and front wall means forming a closed cage, said front wall means including half wall sections, at least one of which is pivoted by means to said end walls along the longitudinal axis of said semi-cylindrical wall, and lever bar means secured to said pivoted half wall section and extending therefrom beyond said longitudinal axis, and latch means acting between said pivoted half wall section and said semi-cylindrical wall and end walls assembly for releasably securing said pivoted half wall section in any one of a plurality of pivoted positions within the cage.

2. An animal cage as claimed in claim 1 wherein said latch means includes a plate having a plurality of detent positions spaced along an arc and a latch member adapted to selectively releasably engage said detent positions.

3. An animal cage as claimed in claim 1 wherein said plate is secured to said pivoted half wall section proximate one of said end walls and said latch member is secured to said one end wall and includes at least one support plate and lever having a latch point pivoted to said support plate.

4. An animal cage as claimed in claim 1 wherein said pivoted half wall section includes a pair of U-shaped frame members pivoted at the ends thereof and a plurality of rods extending between the legs of each of said U-shaped frame members, the U-shaped frame members lying in a common plane.

5. An animal cage as claimed in claim 4 wherein one leg of one U-shaped frame member is adjacent one leg of the other U-shaped frame member with portions thereof remote from said pivots being spaced to define a slotted opening, and said animal cage includes perch defining elements secured to said semi-cylindrical wall substantially parallel to said end walls, said perch defining elements being positioned to be received in said slotted opening as said pivoted half wall section is rotated within said cage.

6. An animal cage as claimed in claim 1 wherein one end wall defines the bottom of said cage, said combination further including a wire rack supported within said cage above said bottom wall and a pan removably mounted in said cage between said wire rack and said bottom wall.

7. An animal cage as claimed in claim 6 wherein said pan is formed as a shallow, substantially semi-cylindrical member having a depressed portion adapted to lie along said longitudinal axis whereby said pan may be rotated about said axis for removal from said cage, the outside bottom wall of said pan being supported on the inside bottom wall of said cage.

8. An animal cage as claimed in claim 6 wherein said end wall defining said bottom wall includes an upstanding flange and a ledge projecting radially inwardly from said upstanding flange for supporting said wire rack.

9. An animal cage as claimed in claim 1 wherein the other of said half wall sections includes means for partially opening same for access to the interior of said cage.

10. An animal cage as claimed in claim 9 wherein said other half wall section includes a frame and a plurality of rods, at least some of which are shorter than others to define an opening in said other half wall section, said last named means including spaced plates slidably mounted on said other rods and a plurality of rods extending between said plates to define a sliding door assembly for selectively closing the opening defined by said shorter rods.

11. An animal cage as claimed in claim 10 wherein one of said plates is discontinuous between the ends thereof to define opposed ends spaced from one another to permit entry of an extremity of an animal therebetween.

12. An animal cage as claimed in claim 1 wherein said other half wall section is pivoted to said end walls along the longitudinal axis of said semi-cylindrical wall.

References Cited

UNITED STATES PATENTS

| 459,216 | 9/1891 | Sumner | 119—17 |
| 744,827 | 11/1903 | Warner | 119—17 |
| 1,468,730 | 9/1923 | Oster | 119—17 |
| 3,094,101 | 6/1963 | Porter | 119—17 X |

HUGH R. CHAMBLEE, Primary Examiner